United States Patent [19]

Blum

[11] Patent Number: 5,344,873
[45] Date of Patent: Sep. 6, 1994

[54] BINDER COMPOSITION AND ITS USE FOR THE PRODUCTION OF A COATING OR SEALING COMPOSITION

[75] Inventor: Harald Blum, Wachtendonk, Fed. Rep. of Germany

[73] Assignee: Bayer Aktiengesellschaft, Leverkusen, Fed. Rep. of Germany

[21] Appl. No.: 958,210

[22] Filed: Oct. 8, 1992

[30] Foreign Application Priority Data

Oct. 15, 1991 [DE] Fed. Rep. of Germany ....... 4134064

[51] Int. Cl.$^5$ .......................... C08J 3/00; C08K 3/20; C08L 75/00
[52] U.S. Cl. .................................. 524/591; 524/539; 524/839; 524/840
[58] Field of Search ................ 524/591, 839, 840, 539

[56] References Cited

U.S. PATENT DOCUMENTS

| | | | |
|---|---|---|---|
| 4,150,946 | 5/1979 | Neel et al. | 8/115.6 |
| 4,152,485 | 5/1979 | Mizumura et al. | 428/425.9 |
| 4,408,008 | 10/1983 | Markusch | 524/591 |
| 4,663,377 | 5/1987 | Hombach et al. | 524/591 |
| 4,857,368 | 8/1989 | Klein | 428/425.1 |
| 5,075,370 | 12/1991 | Kubitza et al. | 524/591 |

FOREIGN PATENT DOCUMENTS 146326  6/1985  European Pat. Off. .

OTHER PUBLICATIONS

Chemical Abstracts, vol. 96, No. 10, Mar. 1982, Abstract No. 69932e "Polyurethane Water Dispersions" & JP-A-81 135 547 (Toyobo).

*Primary Examiner*—Paul R. Michl
*Assistant Examiner*—P. Niland
*Attorney, Agent, or Firm*—Joseph C. Gil; Thomas W. Roy

[57] ABSTRACT

The present invention relates to an aqueous binder composition containing

A) an aqueous solution or dispersion of a water-dilutable organic polyol component containing A1) at least one water-dilutable polyester resin containing sulfonate and hydroxyl groups and having a molecular weight ($M_n$) of 500 to 50,000, an OH number of 20 to 240 mg KOH/g, a content of sulfonate groups ($-SO_3^-$) of 4 to 70 milliequivalents per 100 g of polyester resin and a content of carboxylate groups ($-COO^-$) of 0 to 40 milliequivalents per 100 g of polyester resin and A2) optionally a reactive thinner containing at least one water-soluble monohydric or polyhydric alcohol which has a molecular weight ($M_n$) below 500 and which is non-distillable at normal pressure or has a boiling point of at least 150° C., and B) a polyisocyanate component which is emulsified in the aqueous solution or dispersion A), has a viscosity at 23° C. of 50 to 10,000 mPa.s and contains at least one organic polyisocyanate, wherein components A) and B) are present at an NCO:OH equivalent ratio of 0.5:1 to 5:1.

The present invention also relates to a process for the production of a coating or sealing composition containing this aqueous binder.

20 Claims, No Drawings

BINDER COMPOSITION AND ITS USE FOR THE PRODUCTION OF A COATING OR SEALING COMPOSITION

BACKGROUND OF THE INVENTION

1. Field of the Invention

This invention relates to an aqueous binder composition based on water-dispersible or water-soluble polyester resins containing sulfonate and hydroxyl groups and polyisocyanates and to a process for the production of a coating or sealing composition containing this aqueous binder composition.

2. Description of the Prior Art

By virtue of their outstanding properties, known two-component polyurethane coatings have acquired considerable significance in the coating field. However, a disadvantage is that their processing requires relatively large quantities of organic solvents which have to be eliminated, for example, by subsequent burning. In many applications, especially non-industrial applications, the organic solvents cannot be subsequently burned. Accordingly, high-solids coating compositions, preferably water-dilutable coating compositions are required for such applications in order to minimize solvent emission and the environmental pollution which it causes.

Normally, water cannot readily be used as the liquid phase of two-component polyurethane coating compositions containing free isocyanate groups because isocyanate groups react not only with alcoholic hydroxyl groups, but also with water to form urea and carbon dioxide. The pot life and quality of the coatings are thus generally reduced to levels which are unacceptable.

One possible solution is described in DE-OS 38 29 587 in which certain polyhydroxypolyacrylates are combined with polyisocyanates containing free isocyanate groups to form water-containing two-component systems.

It has now surprisingly been found that water-containing polyester resins containing sulfonate and hydroxyl groups can also be used with polyisocyanates containing free isocyanate groups in water-based two-component binders.

SUMMARY OF THE INVENTION

The present invention relates to an aqueous binder composition containing

A) an aqueous solution or dispersion of a water-dilutable organic polyol component containing
   A1) at least one water-dilutable polyester resin containing sulfonate and hydroxyl groups and having a molecular weight ($M_n$) of 500 to 50,000, an OH number of 20 to 240 mg KOH/g, a content of sulfonate groups ($-SO_3^-$) of 4 to 70 milliequivalents per 100 g of polyester resin and a content of carboxylate groups ($-COO^-$) of 0 to 40 milliequivalents per 100 g of polyester resin and
   A2) optionally a reactive thinner containing at least one water-soluble monohydric or polyhydric alcohol which has a molecular weight ($M_n$) below 500 and which is non-distillable at normal pressure or has a boiling point of at least 150° C., and
B) a polyisocyanate component which is emulsified in the aqueous solution or dispersion A), has a viscosity at 23° C. of 50 to 10,000 mPa.s and contains at least one organic polyisocyanate, wherein components A) and B) are present at an NCO:OH equivalent ratio of 0.5:1 to 5:1.

The present invention also relates to a process for the production of a coating or sealing composition containing this aqueous binder composition by i) emulsifying a polyisocyanate component B) having a viscosity at 22° C. of 50 to 10,000 mPa.s and containing at least one organic polyisocyanate in an aqueous solution or dispersion of a water-dilutable organic polyol component A) containing
   A1) at least one water-dilutable polyester resin containing sulfonate and hydroxyl groups and having a molecular weight ($M_n$) of 500 to 50,000, an OH number of 20 to 240 mg KOH/g, a content of sulfonate groups ($-SO_3^-$) of 4 to 70 milliequivalents per 100 g of polyester resin and a content of carboxylate groups ($-COO^-$) of 0 to 40 milliequivalents per 100 g of polyester resin and
   A2) optionally a reactive thinner containing at least one water-soluble monohydric or polyhydric alcohol which has a molecular weight ($M_n$) below 500 and which is non-distillable at normal pressure or has a boiling point of at least 150° C., at an NCO:OH equivalent ratio of components A) and B) of 0.5:1 to 5:1 and ii) incorporating any optional auxiliaries and additives in the solution or dispersion A) before the addition of the polyisocyanate component.

DETAILED DESCRIPTION OF THE INVENTION

Component A1) is a polyester resin containing sulfonate and hydroxyl groups which has a molecular weight ($M_n$, as determined by gel permeation chromatography using calibrated polystyrene as standard) of 500 to 50,000, preferably 1500 to 20,000; an OH number of 20 to 240, preferably 45 to 190, mg KOH/g solids; a content of sulfonate groups, $-SO_3^-$, of 4 to 70 milliequivalents per 100 g solids; and a content of carboxylate groups, $-COO^-$, of 0 to 40 milliequivalents per 100 g solids. In addition to these salt groups, the polyester resins may also contain free sulfonic acid groups, $-SO_3H$, in an amount of up to 4% by weight and/or free carboxyl groups, $-COOH$, in an amount of up to 3% by weight. Preferably, the polyester resins do not contain urethane or urea groups.

The polyester resins A1) containing sulfonate and hydroxyl groups are preferably produced according to the known polycondensation reaction from a1) 0 to 60% by weight of monocarboxylic acids having a molecular weight of 112 to 340,
a2) 10 to 65% by weight of polycarboxylic acids having a molecular weight of 98 to 600 or the corresponding anhydrides,
a3) 5 to 70% by weight of difunctional or higher functional alcohols having a molecular weight of 62 to 400,
a4) 0 to 30% by weight of monohydric alcohols having a molecular weight of 100 to 299,
a5) 0 to 15% by weight of hydroxycarboxylic acids having a molecular weight of 90 to 280 or the corresponding lactones,
a6) 0 to 15% by weight of aminoalcohols having a molecular weight of 61 to 300 and/or aminocarboxylic acids having a molecular weight of 75 to 260 and a7) 0.5 to 25% by weight of compounds containing sulfonate groups selected from alcohols containing sulfonate groups and aromatic carboxylic acids containing sulfonate groups, wherein the percentages add up to 100.

The reaction is optionally carried out in the presence of typical esterification catalysts, preferably by melt or azeotropic condensation, at temperatures of 140° to 240° C. with removal of water.

Suitable monocarboxylic acids a1) include benzoic acid, tert. butyl benzoic acid, hexahydrobenzoic acid, saturated fatty acids (such as 2-ethyl hexanoic acid, isononanoic acid, coconut oil fatty acid, hydrogenated technical fatty acids or fatty acid mixtures), decanoic acid, dodecanoic acid, tetradecanoic acid, stearic acid, palmitic acid, docosanoic acid; unsaturated fatty acids (such as soybean oil fatty acid, castor oil fatty acid, sorbic acid, peanut oil fatty acid, conjuene fatty acids, tall oil fatty acid or safflower oil fatty acid) and mixtures of these monocarboxylic acids.

Suitable polycarboxylic acids a2) and their anhydrides include phthalic acid (anhydride), isophthalic acid, terephthalic acid, tetrahydrophthalic acid (anhydride), hexahydrophthalic acid (anhydride), maleic acid (anhydride), succinic acid (anhydride), fumaric acid, adipic acid, sebacic acid, azelaic acid, dimer fatty acids, trimer fatty acids, trimellitic acid (anhydride), pyromellitic acid (anhydride) and mixtures thereof.

Suitable polyhydric alcohols a3) include ethylene glycol, 1,2- and 1,3-propylene glycol, 1,3-, 1,4-, 2,3-butanediol, 1,6-hexanediol, 2,5-hexanediol, trimethyl hexanediol, diethylene glycol, triethylene glycol, hydrogenated bisphenols, 1,4-cyclohexanediol, 1,4-cyclohexane dimethanol, neopentyl glycol, tricyclodecanediol, trimethylol propane, glycerol, pentaerythritol, trimethyl pentanediol, dipentaerythritol and mixtures thereof.

Suitable monohydric alcohols a4) include n-hexanol, cyclohexanol, decanol, dodecanol, tetradecanol, octanol, octadecanol, natural fatty alcohol mixtures such as Ocenol 110/130 (available from Henkel KGaA) and mixtures thereof.

Suitable hydroxycarboxylic acids a 5) include dimethylol propionic acid, lactic acid, malic acid, tartaric acid, ε hydroxycaproic acid and ε caprolactone.

Suitable aminoalcohols a6) include aminoethanol, 2-aminopropanol, diethanolamine, aminoacetic acid and 6-aminohexanoic acid.

Suitable compounds a7) include lithium, potassium, sodium, magnesium, calcium or tertiary amine salts of 5-sulfoisophthalic acid, sulfobenzoic acid, sulfophthalic acid, dimethyl sulfoisophthalic acid, 3-hydroxy-5-sulfobenzoic acid and 2-hydroxy-5-sulfobenzoic acid. Sulfonate diols such as those described in DE-OS 2 446 440 (U.S. Pat. No. 4,108,814) are also suitable as synthesis component a7). The carboxy-functional sulfonates obtained by the neutralization of the sulfonic acid group of aromatic sulfocarboxylic acids having a molecular weight of 224 to 360 are preferably used as synthesis component a7). Lithium, potassium and sodium hydroxides, carbonates or bicarbonates and also tertiary amines are preferably used for neutralizing the sulfonic acid groups. Suitable tertiary amines include triethylamine, N,N-dimethyl ethanolamine and N-methyl diethanolamine. It is also possible, but less preferred, to use corresponding acids containing free carboxyl and sulfonic acid groups to carry out the polycondensation reaction with subsequent neutralization of at least a portion of the incorporated sulfonic acid groups.

When polyester resin A1) is prepared by azeotropic esterification, the entraining agent (generally isooctane, xylene, toluene or cyclohexane) is distilled off under vacuum on completion of the reaction.

After the esterification reaction, the polyesters containing sulfonate groups may optionally be subjected to modification reactions such as chain extension, reduction in molecular weight or modification with monofunctional substances.

A suitable modification reaction is the urethanization reaction with isocyanates such as hexamethylene diisocyanate, isophorone diisocyanate, toluylene diisocyanate, 4,4'-bis-(isocyanatohexyl)-methane, stearyl isocyanate, phenyl isocyanate and the known modified polyisocyanate containing biuret, urethane, uretdione, urea and/or isocyanurate groups. This urethanization reaction may also be carried out in the presence of other hydroxy- and/or aminofunctional substances such as hexanediol, neopentyl glycol, stearyl alcohol, hexanol, aminoethanol, hydrazine, polycaprolactone, polyesters, polyacrylates, polyurethanes and/or polyepoxides which also react with isocyanates.

Another possible modification is the copolymerization of vinyl monomers (such as styrene, hydroxyalkyl (meth)acrylates, methyl methacrylate, butyl (meth)acrylate, 2-ethylhexyl (meth)acrylate and methacrylic acid in the presence of the polyesters containing sulfonate groups. In accordance with this modification, chain extension or a reduction in molecular weight can be achieved by grafting or condensation reactions. The copolymerization may be carried out either in organic solution or in aqueous solution or emulsion after dispersion of the polyester resin.

The expression "polyester resins" is intended to encompass both unmodified polyester resins and also polyester resins which have been subsequently modified. Under no circumstances should modified polyesters exceed the above-mentioned limits regarding molecular weight, OH number and sulfonate group content. In other words the modified polyester resins must also comply with these parameters.

In addition to polyester resins A1), the aqueous solution or dispersion A) may contain up to 25% by weight, preferably up to 10% by weight, based on the weight of A1), of reactive thinners A2). Suitable reactive thinners are water-soluble alcohols which are non-distillable at normal pressure or have a boiling point of at least 150° C., preferably polyhydric alcohols having a molecular weight ($M_n$) below 500, preferably below 300. Examples include ethylene glycol, propylene glycol, the isomeric butane diols, polyethylene glycols or polypropylene glycols having the required molecular weight, glycerol, trimethylol propane, pentaerythritol, sorbitol, mannitol and ethoxylation or propoxylation products of these higher functional alcohols having the required molecular weight.

To obtain certain properties, small quantities of organic solvents such as N-methyl pyrrolidone, xylene, toluene, butyl glycol acetate, methoxypropyl acetate, diethylene glycol dimethyl ether, butyl acetate and/or solvent naphtha, may also be added to the aqueous solutions or dispersions A).

In the dispersion step (i.e., the conversion of components A1) and A2) into an aqueous solution or dispersion), the water may alternatively be added to the resin or the resin may be added to the water. If desired, the dispersibility of the resins in water may be improved by the use of external emulsifiers, such as ethoxylated nonylphenol, in the dispersion step. The reactive thinners optionally used may be added to the solutions or dispersions A) before, during or after the dissolution or dispersion of resins A1).

The dispersion step is normally carried out at 40° to 120° C. Component A) preferably has a water content of 35 to 80% by weight, more preferably 45 to 70% by weight. The content of organic auxiliary solvents is preferably at most 8%, more preferably at most 5%. In a particularly preferred embodiment, no auxiliary solvents are used.

The polyol component present in A) is primarily based on components A1) and, optionally, A2). This means that the percentage content of these components is at least 51, preferably at least 80 and more preferably 100 hydroxyl equivalent-%, based on all the alcoholic polyhydroxyl compounds present in A). In addition to compounds A1) and optionally A2), other anionically modified water-dilutable resins may also be present in A).

The polyisocyanate component B) may be any organic polyisocyanate containing aliphatically, cycloaliphatically, araliphatically and/or aromatically bound free isocyanate groups which are liquid at room temperature. The polyisocyanate component B) has a viscosity at 23° C. of 50 to 10,000 mPa.s, preferably 50 to 1000 mPa.s. In a particularly preferred embodiment, the polyisocyanate component B) is a polyisocyanate or polyisocyanate mixture which contains only aliphatically and/or cycloaliphatically bound isocyanate groups, has an (average) NCO functionality of 2.2 to 5.0 and has a viscosity at 23° C. of 50 to 500 mPa.s.

If necessary, the polyisocyanates may be used in admixture with small quantities of inert solvents to reduce the viscosity to a value within the ranges mentioned above. However, the maximum quantity in which the inert solvents are used is limited so that the coating compositions according to the invention ultimately obtained contain at most 20% by weight of solvent, based on the quantity of water. Any solvent present in the polyester dispersions or solutions is included in the calculation.

Solvents suitable as additives for the polyisocyanates include aromatic hydrocarbons, such as "solvent naphtha," and also those previously mentioned for use with component A).

Particularly suitable polyisocyanates include modified polyisocyanates prepared from hexamethylene diisocyanate, 1-isocyanato-3,3,5-trimethyl-5-isocyanatomethyl cyclohexane (IPDI) and/or 4,4'-bis-(isocyanatocyclohexyl)-methane, more preferably those based on hexamethylene diisocyanate. Modified polyisocyanates include the known polyisocyanates containing biuret-, urethane-, uretdione- and/or isocyanurate-modified derivatives of diisocyanates, preferably the diisocyanates set forth above, which after their production, are freed from excess starting diisocyanate in known manner, preferably by distillation, to a residual monomer content of less than 0.5% by weight.

Preferred aliphatic polyisocyanates used in accordance with the invention include biuret-modified polyisocyanates which are prepared from hexamethylene diisocyanate, for example, by the processes according to U.S. Pat. Nos. 3,124,605, 3,358,010, 3,903,126, 3,903,127 or 3,976,622 and which consist of mixtures of N,N',N''-tris-(6-isocyanatohexyl)-biuret with small amounts of its higher homologs. Also preferred are cyclic trimers of hexamethylene diisocyanate corresponding to the above-mentioned criteria which may be obtained in accordance with U.S. Pat. No. 4,324,879 and which contain N,N',N''-tris-(6-isocyanatohexyl)-isocyanurate in admixture with small quantities of its higher homologs.

Particularly preferred aliphatic polyisocyanates are mixtures of uretdione- and/or isocyanurate-modified polyisocyanates which are prepared from hexamethylene diisocyanate by the catalytic oligomerization of hexamethylene diisocyanate using trialkyl phosphines. Particularly preferred mixtures of this type are those which have a viscosity of 50 to 500 mPa.s at 23° C. and an NCO functionality of 2.2 to 5.0.

Hydrophilicized polyisocyanates may also be used. In many cases, certain properties of the binder compositions, for example their stability and compatibility, can be improved in this way. Hydrophilicized polyisocyanates contain, for example, polyether segments based on ethylene and optionally propylene oxide and/or carboxylate groups.

The aromatic polyisocyanates which may also be used in accordance with the invention, but are less preferred, include modified polyisocyanates prepared from 2,4-diisocyanatotoluene and technical mixtures thereof with 2,6-diisocyanatotoluene or those prepared from 4,4'-diisocyanatodiphenyl methane and mixtures thereof with its isomers and/or higher homologs. Aromatic modified polyisocyanates also include the urethane-modified isocyanates obtained by the reaction of more than stoichiometric quantities of 2,4-diisocyanatotoluene with polyhydric alcohols, such as trimethylol propane, and subsequent removal of the unreacted diisocyanate excess by distillation. Other aromatic modified polyisocyanates include the trimers of the monomeric diisocyanates previously described which have been freed from excess monomeric diisocyanates, preferably by distillation, after their production.

It is also possible to use unmodified polyisocyanates of the type mentioned by way of example provided that they correspond to requirements regarding viscosity. Also, polyisocyanate component B) may contain mixtures of the previously mentioned polyisocyanates.

To produce the water-based binder compositions, the polyisocyanate component B) is emulsified in the aqueous binder component A). The dissolved or dispersed polyester resin simultaneously acts as emulsifier for the added polyisocyanate although this function may also be supported by the use of external emulsifiers or hydrophilic polyisocyanates.

Mixing may be carried out simply by stirring at room temperature. The amount of the polyisocyanate component is selected to provide an NCO:OH equivalent ratio, based on the isocyanate groups of component B) and the alcoholic hydroxyl groups of component A), of 0.5:1 to 5:1, preferably 0.8:1 to 2:1.

The auxiliaries and additives of known from coating technology may be incorporated in the polyester resin component A), i.e. the dispersion or solution of polyester resin A1) and optional reactive thinner A2), before it is blended with the polyisocyanate component B). Suitable auxiliaries and additives include foam inhibitors, thickeners, flow control agents, pigments, pigment dispersion aids and the like.

Coating compositions containing the binder compositions according to the invention are produced by the process steps described above. The coating compositions according to the invention are suitable for various applications where water-based painting and coating systems with a superior property profile are currently used. The coating compositions may be used for coating or sealing mineral building materials, such as lime- and/or cement-bonded plasters, gypsum-containing surfaces, fiber cement building materials and concrete; the painting and sealing of wood and wood materials, such as chipboard, fiber board and also paper; the painting and coating of metal surfaces, particularly automobile coatings; the painting and coating of asphalt- and bitumen-containing road surfaces; the painting and sealing of various plastic surfaces; and the surface bonding of various materials, in which case materials of the same type or different types may be bonded to one another. The coating compositions according to the invention may be used as basecoat, filler and top coat binders. They are cured at temperatures from ambient temperature to 250° C., preferably from room temperature up to 80° C.

In the following examples, all percentages are by weight, unless otherwise indicated.

EXAMPLES

Polyester resin A-I 149 g of neopentyl glycol, 169 g of 1,6-hexanediol, 96 g of trimethylol propane, 141 g of phthalic anhydride, 44 g of 5-(lithiumsulfo)-isophthalic acid and 0.4 g of dibutyl tin oxide were weighed into a 2 liter reaction vessel equipped with a stirrer, a heating and cooling system and a water separator and heated for 1 hour under nitrogen to 175° C. Esterification was carried out at 175° C. until the reaction mixture became clear, after which 255 g of phthalic acid were added and the reaction mixture was heated to 200° C. The reaction mixture was then heated until an acid number of $\leq 10$ was reached. After cooling to 100° C., distilled water was slowly added and dispersed for 2 hours at 60° C. An aqueous dispersion of polyester resin A-I containing sulfonate and hydroxyl groups was obtained. The polyester resin had a solids content of approx. 35% and a hydroxyl group content of approx. 4.8%.

Polyester resin A-II 100 g of pentaerythritol, 260 g of trimethylol propane, 25 g of maleic anhydride, 100 g of phthalic anhydride, 250 g of benzoic acid, 85 g of adipic acid, 250 g of Prifrac 2980 (a saturated fatty acid, available from Unichema International), 70 g of 5-(sodiumsulfo)-isophthalic acid and 0.5 g of dibutyl tin oxide were weighed into a 2 liter reaction vessel equipped with a stirrer, a heating and cooling system and a water separator. The mixture was heated slowly for 4 hours to 200° C. and esterified until an acid number of $\leq 15$ was reached. After cooling to approx. 100° C., distilled water was added in such a quantity that an approx. 33% aqueous dispersion was obtained. Polyester resin A-II had a hydroxyl group content of approx. 3.5%.

Polyester resin A-III 1000 g of polyester resin A-I were dissolved together with 67 g of hexanediol in 235 g of diethylene glycol dimethyl ether and, after the addition of 0.5 g of dibutyl tin dilaurate, the resulting solution was heated to 80° C. 111 g of isophorone diisocyanate were then added all at once. The reaction mixture was stirred at 110° C. until no more NCO groups were detected.

After cooling to 90° C., 1070 g of distilled water were added and an approx. 35% dispersion of polyester resin A-III containing sulfonate groups was obtained. The hydroxyl group content of polyester resin A-III was approx. 4.5%.

Polyisocyanate B-I

A mixture of 70 parts by weight of a uretdione-modified, i.e., dimerized, hexamethylene diisocyanate terminated by two free NCO groups and 30 parts by weight of hexamethylene diisocyanate substantially trimerized to N,N',N''-tris-(6isocyanatohexyl)-isocyanurate in admixture with small quantities of higher homologs of both products. As supplied in its 100% solventless form, polyisocyanate B-I had an average viscosity of 150 mPa.s/23° C. and an average content of free NCO groups of 22.5%.

Binder compositions

3% by weight of N-methyl pyrrolidone, 3% by weight of dimethyl diglycol and 0.3% by weight of dimethyl ethanolamine were added to the dispersion of polyester A-I which was then mixed with the polyisocyanate B-I in an NCO:OH equivalent ratio of 1.5:1. The processable binder composition had a gel time of approx. 5 hours. A film prepared from the binder compositions and cured at room temperature was tack-free, clear and crosslinked. The solvent resistance of the film, which was tested after 14 days, was very good.

0.4% by weight of an emulsifier based on nonylphenol grafted with ethylene oxide (Emulgator NP 20, a product of Bayer AG, 10% solution in water) and 0.1% by weight of dimethyl ethanolamine were added to the dispersions of resins A-II and A-III.

Two samples of each of the polyester dispersions were then mixed with polyisocyanate B-I at an NCO:OH equivalent ratio of 1.33:1 and at an NCO:OH equivalent ratio of 2.5:1 and homogenized. The processable binder compositions have a gel time of 3 to 6 hours. Films prepared from the binder compositions were cured at room temperature or for 30 minutes at 150° C. Tack-free, hard and crosslinked films were obtained. The films cured in 10 days at room temperature and possessed good solvent resistance. Films cured at 150° C. possessed very good solvent resistance. Solvent resistance was determined by application of a cotton wool plug impregnated with MIBK: 1 minute with no effect was good, 5 minutes with no effect was very good).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous binder composition comprising
A) an aqueous solution or dispersion of a water-dilutable organic polyol component comprising
   A1) at least one water-dilutable polyester resin containing sulfonate and hydroxyl groups and having a molecular weight ($M_n$) of 500 to 50,000, an OH number of 20 to 240 mg KOH/g, a content of sulfonate groups ($-SO_3^-$) of 4 to 70 milliequivalents per 100 g of polyester resin and a content of carboxylate groups ($-COO^-$) of 0 to 40 milliequivalents per 100 g of polyester resin and
   A2) optionally a reactive thinner containing at least one water-soluble monohydric or polyhydric alcohol which has a molecular weight ($M_n$) below 500 and which is non-distillable at normal pressure or has a boiling point of at least 150° C., and B) a polyisocyanate component which is emulsified in the aqueous solution or dispersion A), has a viscosity at 23° C. of 50 to 10,000 mPa.s and contains at least one organic polyisocyanate, wherein components A) and B) are present at an NCO:OH equivalent ratio of 0.5:1 to 5:1.

2. The aqueous binder composition of claim 1 wherein component A1) comprises the the reaction product of
   a1) 0 to 60% by weight of at least one monocarboxylic acid having a molecular weight of 112 to 340,
   a2) 10 to 65% by weight of at least one polycarboxylic acid having a molecular weight of 98 to 600 or an anhydride thereof,
   a3) 5 to 70% by weight of at least one difunctional or higher alcohol having a molecular weight of 62 to 400,
   a4) 0 to 30% by weight of at least one monohydric alcohol having a molecular weight of 100 to 299,
   a5) 0 to 15% by weight of at least one hydroxycarboxylic acid having a molecular weight of 90 to 280 or a lactone thereof,
   a6) 0 to 15% by weight of at least one aminoalcohol having a molecular weight of 61 to 300 and/or at least one aminocarboxylic acids having a molecular weight of 75 to 260 and
   a7) 0.5 to 25% by weight of at least one compound containing sulfonate groups which is selected from the group consisting of alcohols containing sulfonate groups and aromatic carboxylic acids containing sulfonate groups, wherein the percentages of a1) to a7) add up to 100.

3. The aqueous binder composition of claim 1 wherein component A) has a water content of 35 to 80% by weight, a viscosity at 23° C. of 10 to 30,000 mPa.s and a pH value of 3 to 10.

4. The aqueous binder composition of claim 2 wherein component A) has a water content of 35 to 80% by weight, a viscosity at 23° C. of 10 to 30,000 mPa.s and a pH value of 3 to 10.

5. A process for the production of a coating or sealing composition containing an aqueous binder composition which comprises
   i) emulsifying a polyisocyanate component B) having a viscosity at 23° C. of 50 to 10,000 mPa.s and containing at least one organic polyisocyanate in an aqueous solution or dispersion of a water-dilutable organic polyol component A) containing
      A1) at least one water-dilutable polyester resin containing sulfonate and hydroxyl groups and having a molecular weight ($M_n$) of 500 to 50,000, an OH number 20 to 240 mg KOH/g, a content of sulfonate groups ($-SO_3^-$) of 4 to 70 milliequivalents per 100 g of polyester resin and a content of carboxylate groups ($-COO^-$) of 0 to 40 milliequivalents per 100 g of polyester resin and
      A2) optionally a reactive thinner containing at least one water-soluble monohydric or polyhydric alcohol which has a molecular weight ($M_n$) below 500 and which is non-distillable at normal pressure or has a boiling point of at least 150° C.,
   at an NCO:OH equivalent ratio of components A) and B) of 0.5:1 to 5:1 and
   ii) incorporating any optional auxiliaries and additives in the solution or dispersion A) before the addition of the polyisocyanate component.

6. The process of claim 5 wherein component A1) comprises the the reaction product of
   a1) 0 to 60% by weight of at least one monocarboxylic acid having a molecular weight of 112 to 340,
   a2) 10 to 65% by weight of at least one polycarboxylic acid having a molecular weight of 98 to 600 or an anhydride thereof,
   a3) 5 to 70% by weight of at least one difunctional or higher alcohol having a molecular weight of 62 to 400,
   a4) 0 to 30% by weight of at least one monohydric alcohol having a molecular weight of 100 to 299,
   a5) 0 to 15% by weight of at least one hydroxycarboxylic acid having a molecular weight of 90 to 280 or a lactone thereof,
   a6) 0 to 15% by weight of at least one aminoalcohol having a molecular weight of 61 to 300 and/or at least one aminocarboxylic acids having a molecular weight of 75 to 260 and
   a7) 0.5 to 25% by weight of at least one compound containing sulfonate groups which is selected from the group consisting of alcohols containing sulfonate groups and aromatic carboxylic acids containing sulfonate groups, wherein the percentages of a1) to a7) add up to 100.

7. The process of claim 5 wherein component A) has a water content of 35 to 80% by weight, a viscosity at 23° C. of 10 to 30,000 mPa.s and a pH value of 3 to 10.

8. The process of claim 6 wherein component A) has a water content of 35 to 80% by weight, a viscosity at 23° C. of 10 to 30,000 mPa.s and a pH value of 3 to 10.

9. An aqueous binder composition comprising
   A) an aqueous solution or dispersion of a water-dilutable organic polyol component comprising
      A1) at least one water-dilutable polyester resin containing sulfonate and hydroxyl groups and having a molecular weight ($M_n$) of 500 to 50,000, an OH number of 20 to 240 mg KOH/g, a content of sulfonate groups ($-SO_3^-$) of 4 to 70 milliequivalents per 100 g of polyester resin and a content of carboxylate groups ($-COO^-$) of 0 to 40 milliequivalents per 100 g of polyester resin and
      A2) optionally a reactive thinner containing at least one water-soluble monohydric or polyhydric alcohol which has a molecular weight ($M_n$) below 500 and which is non-distillable at normal pressure or has a boiling point of at least 150° C., and
   B) a non-hydrophilic polyisocyanate component which is emulsified in the aqueous solution or dispersion A), has a viscosity at 23° C. of 50 to 10,000 mPa.s and contains at least one organic polyisocyanate, wherein components A) and B) are present at an NCO:OH equivalent ratio of 0.5:1 to 5:1.

10. The aqueous binder composition of claim 9 wherein component A1) comprises the the reaction product of
   a1) 0 to 60% by weight of at least one monocarboxylic acid having a molecular weight of 112 to 340,
   a2) 10 to 65% by weight of at least one polycarboxylic acid having a molecular weight of 98 to 600 or an anhydride thereof, a3) 5 to 70% by weight of at least one difunctional or higher alcohol having a molecular weight of 62 to 400, a4) 0 to 30% by weight of at least one monohydric alcohol having a molecular weight of 100 to 299, a5) 0 to 15% by weight of at least one hydroxycarboxylic acid having a molecular weight of 90 to 280 or a lactone thereof, a6) 0 to 15% by weight of at least one aminoalcohol having a molecular weight of 61 to 300 and/or at least one aminocarboxylic acid having a molecular weight of 75 to 260 and a7) 0.5 to 25% by weight of at least one compound containing sulfonate groups which is selected from the group consisting of alcohols containing sulfonate groups and aromatic carboxylic acids containing sulfonate groups, wherein the percentages of a1) to a7) add up to 100.

11. The aqueous binder composition of claim 9 wherein component A) has a water content of 35 to 80% by weight, a viscosity at 23° C. of 10 to 30,000 mPa.s and a pH value of 3 to 10.

12. The aqueous binder composition of claim 10 wherein component A) has a water content of 35 to 80% by weight, a viscosity at 23° C. of 10 to 30,000 mPa.s and a pH value of 3 to 10.

13. An aqueous binder composition comprising

A) an aqueous solution or dispersion of one or more water-dilutable organic polyols which do not contain urethane groups and which comprise A1) at least one water-dilutable polyester resin containing sulfonate and hydroxyl groups and having a molecular weight ($M_n$) of 500 to 50,000, an OH number of 20 to 240 mg KOH/g, a content of sulfonate groups ($-SO_3^-$) of 4 to 70 milliequivalents per 100 g of polyester resin and a content of carboxylate groups ($-COO^-$) of 0 to 40 milliequivalents per 100 g of polyester resin and A2) optionally a reactive thinner containing at least one water-soluble monohydric or polyhydric alcohol which has a molecular weight ($M_n$) below 500 and which is non-distillable at normal pressure or has a boiling point of at least 150° C., and B) a polyisocyanate component which is emulsified in the aqueous solution or dispersion A), has a viscosity at 23° C. of 50 to 10,000 mPa.s and contains at least one organic polyisocyanate, wherein components A) and B) are present at an NCO:OH equivalent ratio of 0.5:1 to 5:1.

14. The aqueous binder composition of claim 13 wherein component A1) comprises the the reaction product of a1) 0 to 60% by weight of at least one monocarboxylic acid having a molecular weight of 112 to 340, a2) 10 to 65% by weight of at least one polycarboxylic acid having a molecular weight of 98 to 600 or an anhydride thereof, a3) 5 to 70% by weight of at least one difunctional or higher alcohol having a molecular weight of 62 to 400, a4) 0 to 30% by weight of at least one monohydric alcohol having a molecular weight of 100 to 299, a5) 0 to 15% by weight of at least one hydroxycarboxylic acid having a molecular weight of 90 to 280 or a lactone thereof, a6) 0 to 15% by weight of at least one aminoalcohol having a molecular weight of 61 to 300 and/or at least one aminocarboxylic acid having a molecular weight of 75 to 260 and a7) 0.5 to 25% by weight of at least one compound containing sulfonate groups which is selected from the group consisting of alcohols containing sulfonate groups and aromatic carboxylic acids containing sulfonate groups, wherein the percentages of a1) to a7) add up to 100.

15. The aqueous binder composition of claim 13 wherein component A) has a water content of 35 to 80% by weight, a viscosity at 23° C. of 10 to 30,000 mPa.s and a pH value of 3 to 10.

16. The aqueous binder composition of claim 14 wherein component A) has a water content of 35 to 80% by weight, a viscosity at 23° C. of 10 to 30,000 mPa.s and a pH value of 3 to 10.

17. An aqueous binder composition comprising

A) an aqueous solution or dispersion of one or more water-dilutable organic polyols which do not contain urethane groups and which comprise A1) at least one water-dilutable polyester resin containing sulfonate and hydroxyl groups and having a molecular weight ($M_n$) of 500 to 50,000, an OH number of 20 to 240 mg KOH/g, a content of sulfonate groups ($-SO_3^-$) of 4 to 70 milliequivalents per 100 g of polyester resin and a content of carboxylate groups ($-COO^-$) of 0 to 40 milliequivalents per 100 g of polyester resin and A2) optionally a reactive thinner containing at least one water-soluble monohydric or polyhydric alcohol which has a molecular weight ($M_n$) below 500 and which is non-distillable at normal pressure or has a boiling point of at least 150° C., and B) a non-hydrophilic polyisocyanate component which is emulsified in the aqueous solution or dispersion A), has a viscosity at 23° C. of 50 to 10,000 mPa.s and contains at least one organic polyisocyanate, wherein components A) and B) are present at an NCO:OH equivalent ratio of 0.5:1 to 5:1.

18. The aqueous binder composition of claim 17 wherein component A1) comprises the reaction product of a1) 0 to 60% by weight of at least one monocarboxylic acid having a molecular weight of 112 to 340, a2) 10 to 65% by weight of at least one polycarboxylic acid having a molecular weight of 98 to 600 or an anhydride thereof, a3) 5 to 70% by weight of at least one difunctional or higher alcohol having a molecular weight of 62 to 400, a4) 0 to 30% by weight of at least one monohydric alcohol having a molecular weight of 100 to 299, a5) 0 to 15% by weight of at least one hydroxycarboxylic acid having a molecular weight of 90 to 280 or a lactone thereof, a6) 0 to 15% by weight of at least one aminoalcohol having a molecular weight of 61 to 300 and/or at least one aminocarboxylic acids having a molecular weight of 75 to 260 and a7) 0.5 to 25% by weight of at least one compound containing sulfonate groups which is selected from the group consisting of alcohols containing sulfonate groups and aromatic carboxylic acids containing sulfonate groups, wherein the percentages of a1) to a7) add up to 100.

19. The aqueous binder composition of claim 17 wherein component A) has a water content of 35 to 80% by weight, a viscosity at 23° C. of 10 to 30,000 mPa.s and a pH value of 3 to 10.

20. The aqueous binder composition of claim 18 wherein component A) has a water content of 35 to 80% by weight, a viscosity at 23° C. of 10 to 30,000 mPa.s and a pH value of 3 to 10.

* * * * *